US012561451B2

(12) United States Patent
Erickson et al.

(10) Patent No.: US 12,561,451 B2
(45) Date of Patent: Feb. 24, 2026

(54) MULTI-PROCESSOR DEVICE WITH SECURE PROCESSOR-CONTROLLED ACCESS TO MEMORY

(71) Applicant: Rambus Inc., San Jose, CA (US)

(72) Inventors: Evan Lawrence Erickson, Chapel Hill, NC (US); Taeksang Song, San Jose, CA (US)

(73) Assignee: Rambus Inc., San Jose, CA (US)

( * ) Notice: Subject to any disclaimer, the term of this patent is extended or adjusted under 35 U.S.C. 154(b) by 407 days.

(21) Appl. No.: 18/074,225

(22) Filed: Dec. 2, 2022

(65) Prior Publication Data

US 2023/0177176 A1 Jun. 8, 2023

Related U.S. Application Data

(60) Provisional application No. 63/286,898, filed on Dec. 7, 2021.

(51) Int. Cl.
*G06F 21/60* (2013.01)
*G06F 21/54* (2013.01)
*G06F 21/85* (2013.01)

(52) U.S. Cl.
CPC ............ *G06F 21/602* (2013.01); *G06F 21/54* (2013.01); *G06F 21/85* (2013.01)

(58) Field of Classification Search
CPC ........ G06F 21/602; G06F 21/54; G06F 21/85; G06F 21/575; G06F 21/72; G06F 21/74

USPC .......................................................... 726/26
See application file for complete search history.

(56) References Cited

U.S. PATENT DOCUMENTS

| | | | | |
|---|---|---|---|---|
| 5,222,215 | A * | 6/1993 | Chou | .................... G06F 9/4812 |
| | | | | 710/262 |
| 7,581,111 | B2 | 8/2009 | Wagner et al. | |
| 7,886,053 | B1 | 2/2011 | Newstadt et al. | |
| 8,145,902 | B2 * | 3/2012 | Hatakeyama | ........... G06F 21/71 |
| | | | | 713/161 |
| 8,543,838 | B1 | 9/2013 | Au et al. | |
| 9,317,329 | B2 | 4/2016 | Tejaswini et al. | |
| 2004/0103299 | A1 * | 5/2004 | Zimmer | ................ G06F 9/4416 |
| | | | | 713/193 |
| 2004/0158742 | A1 * | 8/2004 | Srinivasan | .............. G06F 21/52 |
| | | | | 726/4 |
| 2006/0059372 | A1 | 3/2006 | Fayar et al. | |
| 2006/0198515 | A1 | 9/2006 | Forehand et al. | |
| 2017/0060637 | A1 * | 3/2017 | Persson | .................. G06F 21/55 |
| 2018/0144136 | A1 * | 5/2018 | Nadarajah | ............. G06F 21/575 |
| 2019/0187994 | A1 * | 6/2019 | Macchetti | ............... G06F 21/72 |
| 2021/0311643 | A1 * | 10/2021 | Shanbhogue | ......... G06F 3/0622 |
| 2022/0114125 | A1 * | 4/2022 | Thakur | ............... G06F 13/4022 |

* cited by examiner

*Primary Examiner* — Taghi T Arani
(74) *Attorney, Agent, or Firm* — Lance Kreisman; Peninsula Patent Group

(57) ABSTRACT

A multi-processor device is disclosed. The multi-processor device includes memory interface circuitry to access external memory. A primary processor is selectively coupled to the interface circuitry. A secure processor enables/disables access to the memory interface circuitry by the primary processor based on an operating mode of the multi-processor IC chip.

20 Claims, 5 Drawing Sheets

RECEIVE CRYPTOGRAPHICALLY SIGNED COMMAND FROM EXTERNAL ENTITY 302

GENERATE CHALLENGE NONCE 304

TRANSMIT CHALLENGE NONCE TO EXTERNAL ENTITY 306

RECEIVE SIGNED HASH FROM EXTERNAL ENTITY 308

COMPUTE HASH OF NONCE AND COMMAND 310

EXTERNAL ENTITY SIGNATURE VERIFIED? 312

N

SEND ERROR MSG 314

Y

ENABLE ACCESS TO MEMORY BY THE PRIMARY PROCESSOR 316

ENABLE ACCESS TO MEMORY BY THE PRIMARY PROCESSOR AS PART OF BOOT-UP BY SECURE PROCESSOR 402

PERFORM INITIALIZATION OPERATIONS WITH PRIMARY PROCESSOR 404

PERFORM SECURITY OPERATIONS WITH SECURE PROCESSOR 406

DISABLE MEMORY ACCESS FOR PRIMARY PROCESSOR 408

500

MULTI-PROCESSOR DEVICE WITH SECURE PROCESSOR-CONTROLLED ACCESS TO MEMORY

CROSS-REFERENCE TO RELATED APPLICATIONS

This application is a Non-Provisional that claims priority to U.S. Provisional Application No. 63/286,898 filed Dec. 7, 2021, entitled MULTI-PROCESSOR DEVICE WITH SECURE PROCESSOR-CONTROLLED ACCESS TO MEMORY, which is incorporated herein by reference in its entirety.

TECHNICAL FIELD

The disclosure herein relates to multi-processor devices, and related methods, systems and modules that employ such devices.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of multi-processor devices, methods, systems and associated integrated circuit devices are disclosed herein. One embodiment of a multi-processor device described herein includes memory interface circuitry to access external memory. A primary processor is selectively coupled to the memory interface circuitry. A secure processor enables/disables access to the memory interface circuitry by the primary processor based on an operating mode of the multi-processor device. By providing the secure processor with the ability to selectively gate access to the memory interface by the primary processor, certain memory access operations between the primary processor and the memory interface may be handled in a controlled and secured manner.

Figure 1:
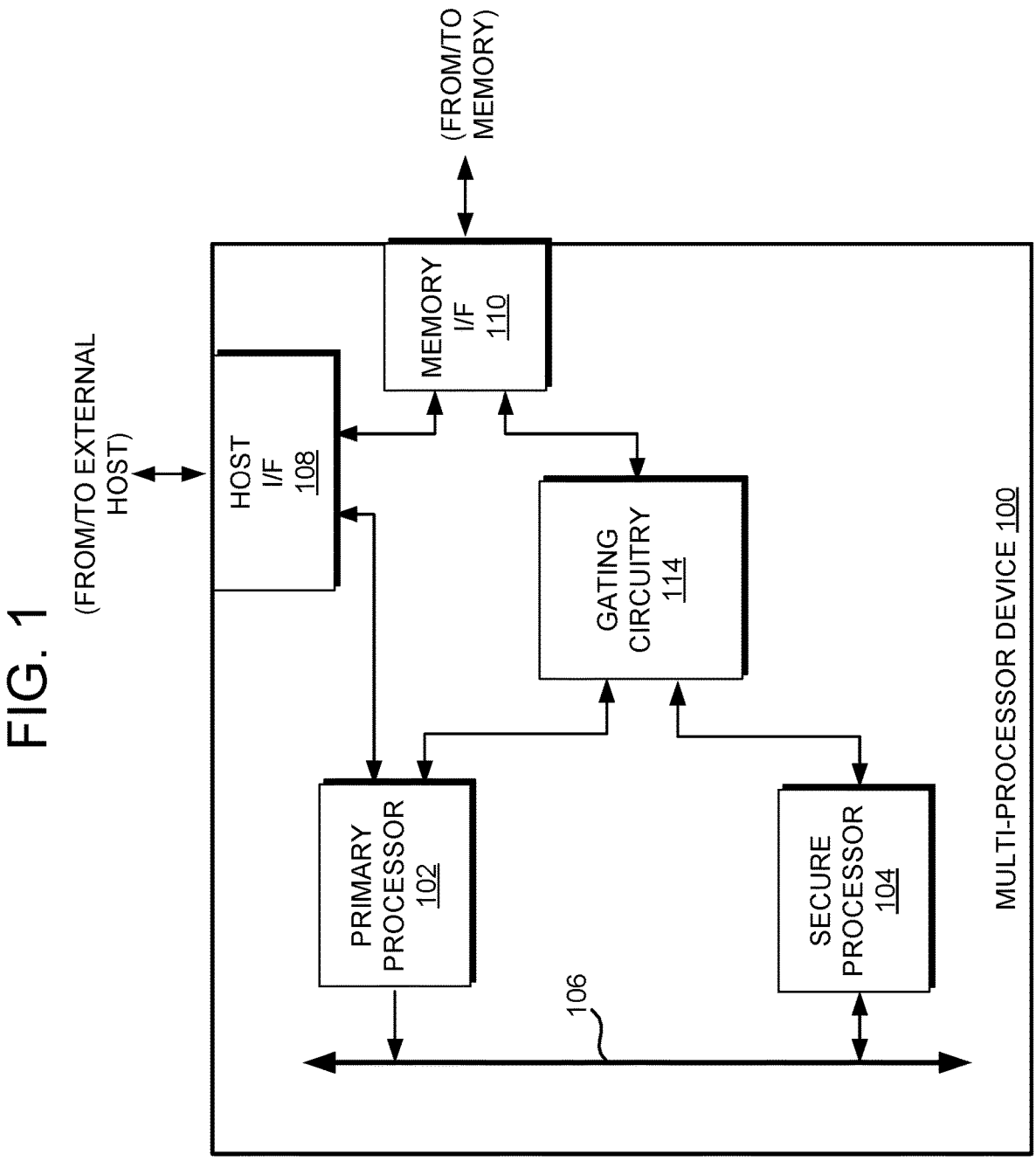
FIG. 1 illustrates one embodiment of a multi-processor device.

Referring now to FIG. 1, one embodiment of a multi-processor device, generally designated 100, includes a primary processor 102 coupled to a secure processor 104 via a bus 106. For one specific embodiment, the primary processor 102 is configured as a master processor responsible for overall control of the multi-processor device 100, while the secure processor 104 is configured to operate on behalf of the primary processor 102 during a normal mode of operation. During an initialization mode of operation, the secure processor is configured to manage secure boot-up sequences and perform other cryptographically-related tasks. For some embodiments, the secure processor 104 takes the form of a root of trust (ROT), to carry out cryptographic operations on behalf of the primary processor 102. Acting on behalf of the primary processor 102, the secure processor 104 may decrypt incoming requests, encrypt outgoing responses from the primary processor, perform attestation operations and other cryptographically-related tasks as the need arises.

For one embodiment, the primary processor 102 and the secure processor 104 take the form of processor cores disposed on a single integrated circuit (IC) die, or chip, forming a system-on-chip (SoC). In such an embodiment, the bus 106 may form one or more of an advanced extensible interface (AXI) for high-speed communications on-chip between the primary processor 102 and the secure processor 104, and/or an advanced peripheral bus (APB) for low-speed control signals transferred on-chip between the processors. Other embodiments may employ separate processor chips disposed on a common substrate to form a chiplet, multi-chip module (MCM) or system-in-package (SIP). Yet other embodiments may employ an interconnected system of multiple packaged processors disposed on separate substrates.

Further referring to FIG. 1, the primary processor 102 generally controls all transfers of requests, data and/or messages dispatched between the multi-processor device 100 and a host (not shown) via a host interface 108. The requests may take the form of commands and/or interrupts alerting the primary processor 102 to actions that need to be taken. For one embodiment, the host 108 at least partially takes the form of a serial management bus (SMBus), inter-integrated circuit (I2C), improved inter-integrated circuit (I3C), or similar chip communications interface. In certain embodiments, as explained more fully below with respect to FIG. 5, the host interface 108 may also include a high-bandwidth Compute Express Link (CXL) interface.

With continued reference to FIG. 1, for some embodiments, the multi-processor device 100 includes a memory interface 110 that communicates with off-chip module memory (not shown). For one embodiment, the off-chip module memory takes the form of volatile or non-volatile memory disposed on one or memory modules (such as memory module 504, shown in FIG. 5). In many situations, to enhance security, the memory interface 110 is configured to restrict read and/or write access to the off-chip module memory by the primary processor 102. Thus, during a normal mode of operation involving read and write transactions with the off-chip module memory, generally only the host is granted access to the off-chip module memory.

To enhance initialization processes such as those involving boot-up and debug operations, one embodiment of the multi-processor device 100 includes gating circuitry 114 that is coupled to the secure processor 104 and interposed between the primary processor 102 and the memory interface circuitry 110. Generally, the gating circuitry 114 cooperates with the secure processor 104 (such as, for example, being responsive to a control signal from the secure processor 104) to enable access to the memory interface circuitry 110 by the primary processor 102 during the initialization mode of operation, which may involve system boot-up sequences and/or an assertion of debug activities to address a detected failure, and to disable access to the memory interface circuitry 110 by the primary processor 102 during the normal mode of operation. Further, although FIG. 1 illustrates a separate circuit block for the gating circuitry 114, for some embodiments, circuitry may be included in whole or in part in the circuitry of the secure processor 104 to perform one or more of the gating functions described above.

Figure 2:
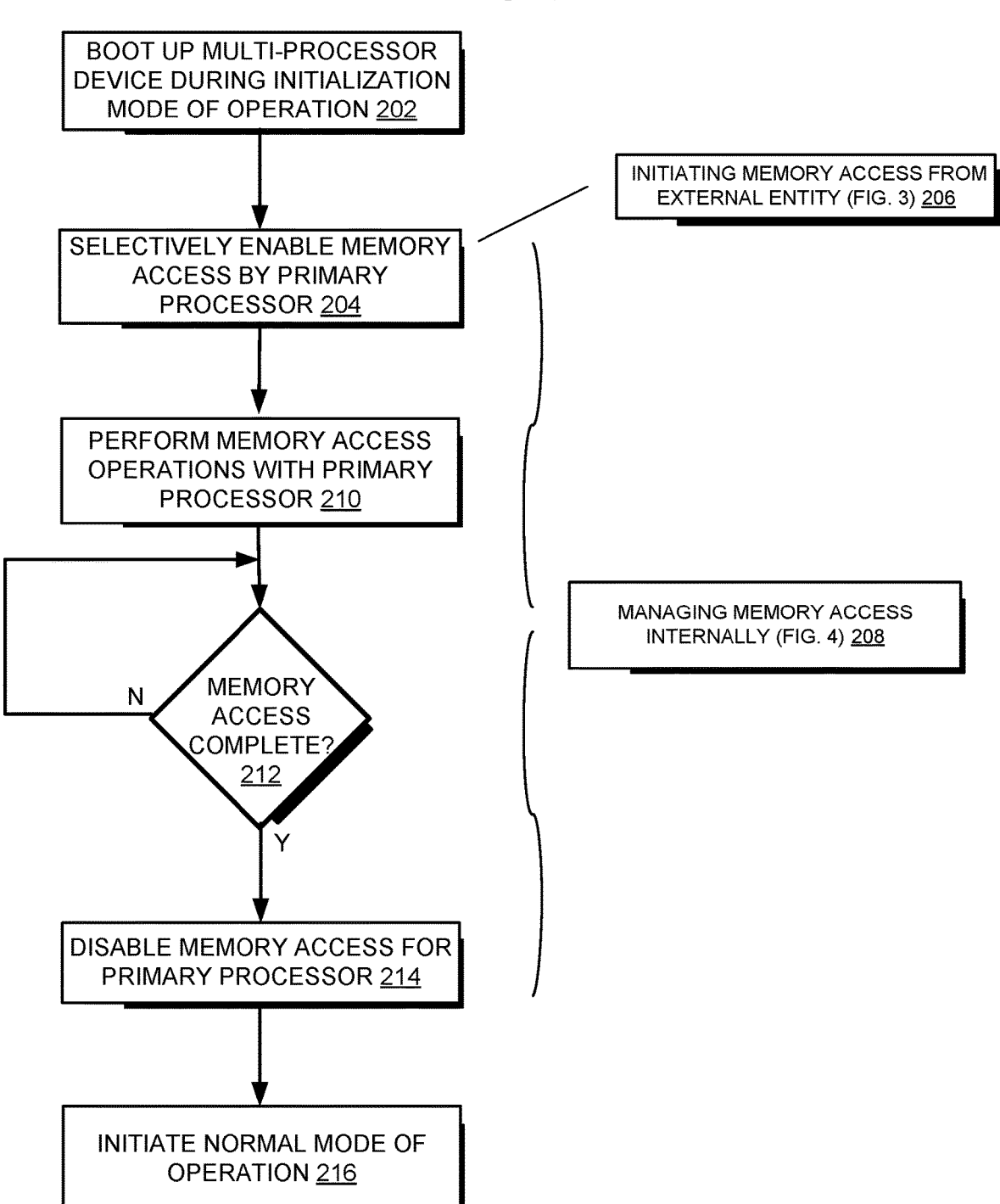
FIG. 2 illustrates a flowchart of steps for operating the multi-processor device of FIG. 1.

FIG. 2 illustrates a flowchart of steps for one specific embodiment of a method that may be performed to operate the multi-processor device 100 in a manner that selectively provides access to the off-chip module memory by the primary processor 102. Generally, at any given time the multi-processor device 100 may operate in accordance with one of the multiple modes of operation. During the initialization mode of operation, at 202, the multi-processor device 100 undertakes steps to boot up and load operating system firmware into both processors 102 and 104 and perform all necessary initialization operations and configuration tasks to place the primary and secure processors 102 and 104 in condition to interface with an external host (not shown). Note that the initialization mode may not only be entered by starting-up the multi-processor device 100, but also by going from the normal mode of operation (such as being in an online state) to an offline state. This may occur due to, for example, a failure detected in operations associated with one or more of the processors 102 and 104, and/or the off-chip module memory.

Further referring to FIG. 2, at 204, the initialization operations include temporarily enabling access to the off-chip module memory by the primary processor 102. Depending on the situation, access to the off-chip module memory may allow the primary processor 102 to carry out read and/or write operations with the module memory in support of, for example, debug and/or built-in-self-test processes. In some situations, for maximum security, the primary processor 102 is granted solely write access to the module memory during the initialization mode of operation.

Figure 3:
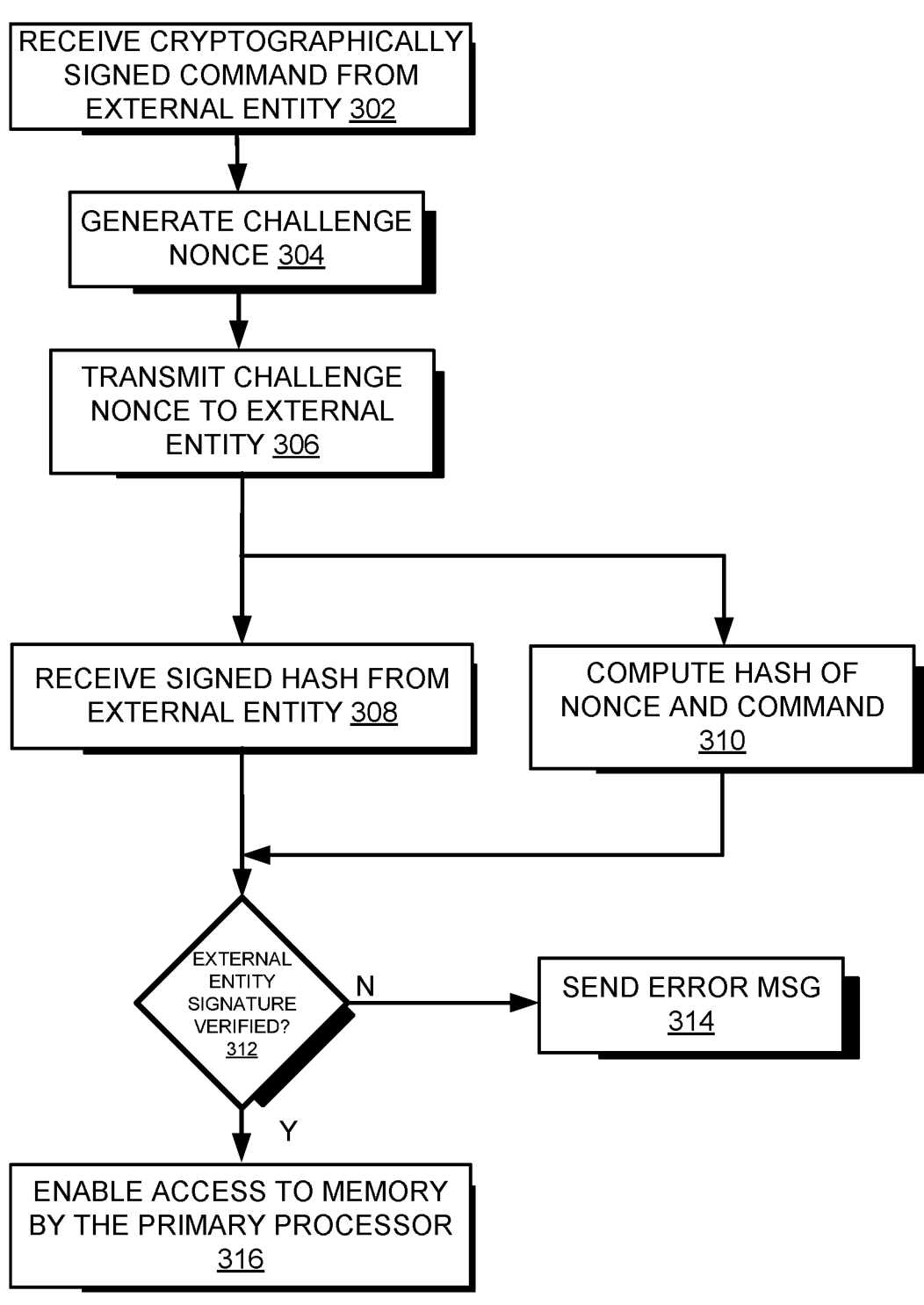
FIG. 3 illustrates steps for initiating a memory access to memory from an external entity for the selectively enabling memory access by the primary processor step of FIG. 2.

For one embodiment, access to the off-chip module memory by the primary processor 102 is controlled via an external entity, at 206. The external entity may be a host device, or other device disposed in local or remote communication with the multi-processor device 100. FIG. 3 illustrates further steps employed for one embodiment of enabling/disabling memory access by the primary processor 102 via the external entity. Since the selective control for carrying out the enabling is handled off-chip, communications between the multi-processor device 100 and the external entity may be executed via the host interface 108 (FIG. 1). The communications may begin, for example, with a cryptographically signed command from the external entity, at 302, directing the secure processor 104 to cooperate in configuring the gating circuitry 114 to grant the primary processor 102 access to the off-chip module memory via the memory interface 110. The cryptographically signed command sent by the external entity may be associated with a private key along with a public key that has already been provisioned to the secure processor 104.

Further referring to FIG. 3, in response to receiving the cryptographically signed command, the secure processor 104 verifies that the command emanated from an authenticated entity and generates a challenge nonce, at 304. The challenge nonce provides a further layer of protection against replay attacks by ensuring that the external entity has the private key. In one embodiment, the challenge nonce may take the form of a randomly or pseudo-randomly generated number. The challenge nonce is then transmitted back to the external entity, at 306, via the host interface 108. The external entity receives the challenge nonce, cryptographically signs it, and returns the cryptographically signed challenge nonce as a signed hash, where it is received by the secure processor 104, at 308. While the external entity generates and transmits its cryptographically signed challenge nonce, the secure processor 104 computes a local hash of the challenge nonce and cryptographically signed command, at 310. The received cryptographically signed hash, essentially a cryptographic signature from the external entity, is then compared to the locally-generated hash, where a determination is made, at 312, as to whether the received hash from the external entity is valid. This determination may involve comparing the signatures to see if they match, which would validate the signature from the external entity. If the signature cannot be verified, then an error message is sent to the external entity, at 314. If the signature is verified, then the secure processor 104 temporarily configures the gating circuitry 114 to grant access to the off-chip module memory by the primary processor 102, at 316.

Referring briefly back to FIG. 2, once the primary processor 102 is able to access the off-chip module memory, it may then carry out write and/or read operations with the off-chip module memory, at 210. This may involve dispatching commands to the off-chip module memory to carry out, for example, various BIST and/or debug tasks during the initialization mode of operation concerning the off-chip module memory. Once the tasks involving the memory access are determined to be complete, at 212, the secure processor 104 configures the gating circuitry 114 to disable memory access by the primary processor 102, at 214. Once access to the off-chip module memory by the primary processor 102 is disabled, the secure processor 104 initiates the normal mode of operation, at 216, which involves configuring the multi-processor device 100 such that only the host may access the off-chip module memory via the memory interface 110.

Figure 4:
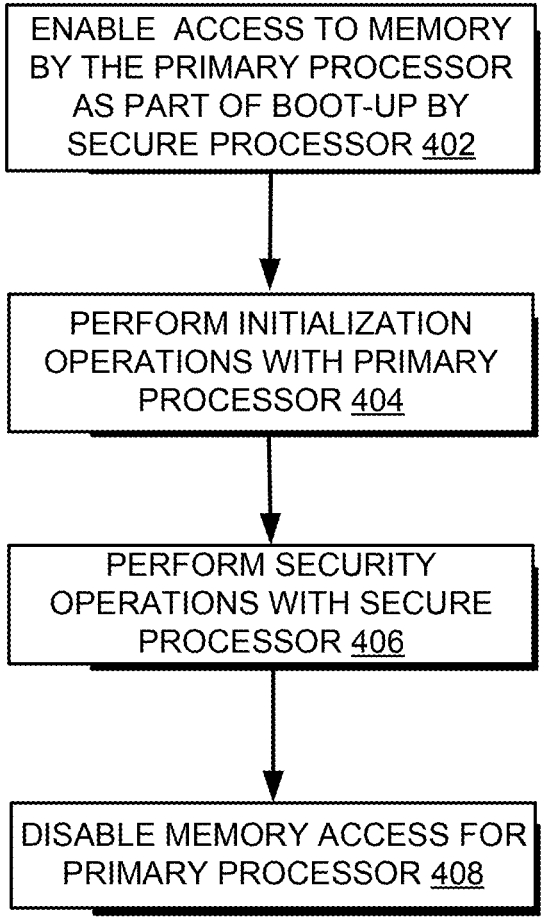
FIG. 4 illustrates steps for managing memory access internally for the selectively enabling memory access by the primary processor step of FIG. 2.

In a further embodiment, and further referring to FIG. 2, instead of enabling and disabling access to the off-chip module memory via an external entity, access to the off-chip module memory may be managed internally by the secure processor 104, at 208. Further details regarding the internally-managed memory access process are shown in FIG. 4. For one embodiment, during the initialization mode of operation, the secure processor 104 is configured to manage the boot-up operations in stages. Generally, each boot stage involves authentication of a cryptographic signature that has a chain of validation beginning with signed firmware that was formed as hardware in the secure processor logic during manufacture. As an example, once the root firmware boots up, a next layer of firmware may be accessed from, for example, a one-time programmable (OTP) memory and verified by the root layer firmware. A next level of firmware may then be accessed from, as an example, an electrically-erasable programmable read only memory (EEPROM) and verified by the prior authenticated OTP-accessed firmware, and so on, until the primary processor hardware signature is verified. At that point, the secure processor 104, knowing that it is about to bring up the primary processor 102 in the boot-up sequence, and that the primary processor 102 may need to perform certain operations (such as BIST and/or debug) on the off-chip module memory during initialization, may additionally enable access to the off-chip module memory by the primary processor 102, at 402. In some embodiments, the secure processor 104 may enable access to the off-chip module memory by the primary processor 102 without dispatching a command to the gating circuitry 114.

Further referring to FIG. 4, once the secure processor 104 enables access to the module memory by the primary processor, the primary processor 102 may then perform its memory-related initialization operations, at 404. As noted above, these operations may involve BIST-related activities and/or various debug tasks to ensure that the off-chip module memory is able to function properly during the normal mode of operation.

With continued reference to FIG. 4, while the primary processor 102 performs its initialization tasks with the off-chip module memory through one or more memory transactions, the secure processor 104 may perform various security-related initialization operations, at 406. One such operation involves device attestation, which generally involves steps taken by the secure processor 104 to provide evidence that, for example, the multi-processor device 100 is a particular device made by a particular manufacturer. This may involve an exchange of keys, measurements of the state of the firmware, and so forth. For one embodiment, the device attestation process serves as a trigger to guide the secure processor 104 into disabling memory access to the off-chip module memory by the primary processor 102, at 408. Other embodiments may utilize other trigger mechanisms, such as, for example, a timer constraint involving a timeout trigger, or when a message is received from the primary processor. Once memory access by the primary processor 102 is disabled, then the secure processor 104 may initiate the normal mode of operation, at 216 (FIG. 2).

The multi-processor device 100 and the associated recovery methods described above lend themselves well to applications involving distributed processing with hardware-based security schemes. In the field of distributed memory processing and memory pooling, CXL Type 3 devices, such as CXL buffers, may exhibit significantly improved reliability through adoption of the multi-processor device structures and associated methods disclosed herein.

Figure 5:
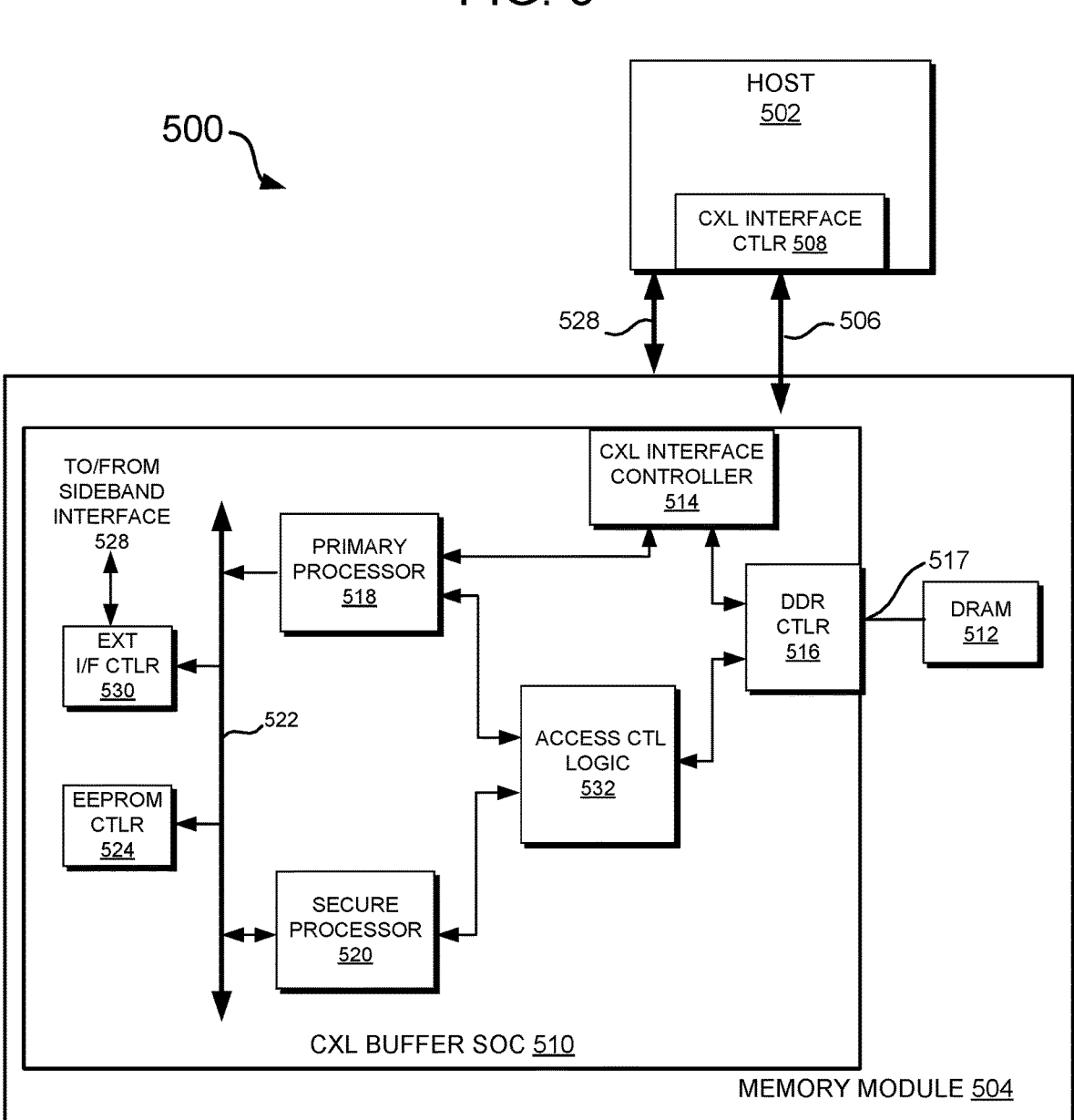
FIG. 5 illustrates one embodiment of a memory system employing a compute express link (CXL) buffer integrated circuit (IC) chip that is similar to the multi-processor device of FIG. 1.

FIG. 5 illustrates one specific embodiment of a memory system, generally designated 500, that employs a CXL Type 3 memory device in the form of a CXL buffer 510. The memory system 500 includes a host 502 that interfaces with a memory module 504 primarily through a CXL link 506. For one embodiment, the host includes a host CXL interface controller 508 for communicating over the CXL link 506 utilizing protocols consistent with the CXL standards, such as CXL.io and CXL.mem. For some embodiments that involve CXL Type 2 devices, an additional CXL.cache protocol may also be utilized.

Further referring to FIG. 5, the memory module 504 is configured to generally support the distributed CXL memory architecture, thus allowing one or more hosts to access module memory 512. While shown as DRAM 512, the module memory may take the form of volatile (DRAM) memory devices and/or non-volatile memory devices, via the CXL buffer 510. For one embodiment, the CXL buffer 510 takes the form of a system-on-chip (SOC) and includes many of the features described above with respect to the multi-processor device 100 (FIG. 1).

With continued reference to FIG. 5, one embodiment of the CXL buffer 510 employs a primary interface that includes the in-band CXL external interface controller 514 and module memory control circuitry in the form of a dynamic random access memory (DRAM) controller 516. The in-band CXL external interface controller 514 and the memory controller 516 cooperate to provide a transfer path between the in-band CXL link 506 and the module memory 512. For one embodiment, the module memory control circuitry 516 includes a double data rate (DDR) memory controller to manage the DRAM module memory 512 via a secondary interface, at 517. A primary processor 518 is configured to solely control the memory control circuitry 516 during a normal mode of operation, although gated from having access to the module memory 512 during the normal mode of operation. In accordance with CXL standards, the primary processor 518 controls the in-band CXL interface 514, yet is prevented from directly accessing the module memory 512 in most circumstances to enhance security.

Acting on behalf of the primary processor 518, a secure processor 520 is coupled to the primary processor 518 via an internal system bus 522. As explained above with respect to the multi-processor device 100 (FIG. 1), the secure processor 520 may take the form of a hardware root of trust (RoT) to carry out cryptographic operations on behalf of the primary processor 518 during the normal mode of operation. For one CXL-related embodiment, the secure processor 520 is responsible for encryption/decryption in hardware, as necessary, and may include storage to store cryptographic keys securely. The secure processor 520 also participates in device attestation operations, confirming that a given device is what it says it is, through certificate verification and or other identity confirmation techniques. For some embodiments, the secure processor 520 may exclusively control the secure boot flow for the CXL buffer 510 during an initialization mode of operation. Thus, consistent with the boot-up flow described above with respect to FIGS. 2-4, every piece of firmware that loads is validated by an attached signature that is referenced or tied to a signature component or key that is physically written in the CXL buffer hardware.

Similar to the multi-processor device 100 embodiment of FIG. 1, the CXL buffer 510 additionally includes a nonvolatile memory controller 524 that interfaces with memory storage, such as EEPROM, to control the storage of firmware components used in booting up the CXL buffer 510, and for performing selective memory access operations concerning the primary processor 518 as described above with respect to FIGS. 2-4.

Further referring to FIG. 5, for one embodiment, communications between the host 502 and the memory module 504 are enhanced through the use of a side-band channel or link 528 that is independent of the CXL link 506. To support use of the side-band channel, the CXL buffer 510 employs additional external interface circuitry in the form of a side-band external interface controller 530, which may support link protocols such as SMBus, I2C and/or I3C to name but a few. Use of the side-band link 528 during initialization or debug modes of operation provides an auxiliary channel for the CXL buffer 510 (via the secure processor 520) to communicate with the host 502 regarding certain commands and other actions. This does not impact use of the side-band link during the normal mode of operations which allows the host 502 to communicate with the CXL buffer 510 without interfering with CXL-related signal transfers.

With continued reference to FIG. 5, one embodiment of the CXL buffer 510 includes access control logic 532 that generally enables/disables the primary processor 518 from accessing the DRAM memory 512 in much the same way as the gating circuitry 114 of FIG. 1. For one specific embodiment, access control signals may be generated by the secure processor 520 and fed to the access control logic 532 to control when the primary processor 518 may access the DRAM memory 512. Like the embodiment of FIG. 1, circuitry may be included in the secure processor 520 to perform one or more of the gating functions described above to cooperate with or to act as a substitute for the access control logic 532.

The system 500 of FIG. 5 operates generally to allow for accesses to the module memory 512 by the host 502 in a secure manner. Central to the system operation is the CXL buffer 510 operation, since it has overall control of all module memory accesses and the responsibility of securing all memory transactions. As a more specific form of the multi-processor device 100, the CXL buffer 510 generally operates in much the same way as described above and illustrated in FIGS. 2-4, with slight variations to account for specific CXL protocols and associated circuitry.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "I" attached to signal names indicates that the signal is an active low signal (i.e., the asserted state is a logic low state). A line over a signal name (e.g., '$\overline{<signalname>}$') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A multi-processor integrated circuit (IC) chip, comprising:
   memory interface circuitry to access external memory;
   a primary processor selectively coupled to the memory interface circuitry;
   a secure processor to perform cryptographic operations on behalf of the primary processor during a normal mode of operation; and
   gating circuitry coupled to the secure processor and interposed between the primary processor and the memory interface circuitry to selectively gate read and write accesses between the secure processor and the external memory, the gating circuitry responsive to a control signal from the secure processor to enable access to the memory interface circuitry by the primary processor during a system boot-up mode of operation, and to disable access to the memory interface circuitry by the primary processor for all memory access operations carried out during the normal mode of operation.

2. The multi-processor IC chip of claim 1, wherein the secure processor comprises:
   a hardware root-of-trust processor utilizing Public Key Infrastructure (PKI).

3. The multi-processor IC chip of claim 1, wherein the memory interface circuitry comprises:
   a compute express link (CXL) interface managed by the primary processor; and
   a memory controller selectively coupled to the primary processor via the gating circuitry.

4. The multi-processor IC chip of claim 3, wherein the control signal is generated by the secure processor in response to receiving a cryptographic command signal from an external entity.

5. The multi-processor IC chip of claim 4, wherein the cryptographic command signal comprises a signed command combined with a challenge nonce.

6. The multi-processor IC chip of claim 4, wherein:
   the cryptographic command signal is received by the primary processor and subsequently forwarded to the secure processor.

7. The multi-processor IC chip of claim 4, further comprising:
   an external interface independent from the CXL interface; and
   wherein the cryptographic command signal is received by the multi-processor IC chip via the external interface.

8. The multi-processor IC chip of claim 1, wherein the control signal is generated by the secure processor based on an internal boot sequence status.

9. The multi-processor IC chip of claim 1, wherein the secure processor enables access to the memory interface circuitry by the primary processor during the system boot-up mode of operation to perform one or more of built-in-self-test (BIST) and debug operations associated with the external memory.

10. The multi-processor IC chip of claim 1, wherein the secure processor enables read accesses to the memory interface circuitry by the primary processor independently of write accesses to the memory interface circuitry by the primary processor.

11. A multi-processor integrated circuit (IC) device, comprising:

memory interface circuitry to access external memory;

a primary processor selectively coupled to the memory interface circuitry; and a secure processor to generate a control signal to enable/disable read and write access to the memory interface circuitry by the primary processor based on an operating mode of the multi-processor IC device, wherein the secure processor enables access to the memory interface circuitry by the primary processor during a system boot-up mode of operation, and wherein the secure processor disables access to the memory interface circuitry for all memory access operations by the primary processor carried out during a normal mode of operation.

12. The multi-processor IC device of claim 11, wherein the secure processor comprises:

a hardware root-of-trust processor utilizing Public Key Infrastructure (PKI).

13. The multi-processor IC device of claim 11, further comprising:

gating circuitry coupled to the secure processor and interposed between the primary processor and the memory interface circuitry, the gating circuitry responsive to a control signal from the secure processor to enable access to the memory interface circuitry by the primary processor during the system boot-up mode of operation, and to disable access to the memory interface circuitry by the primary processor during the normal mode of operation.

14. The multi-processor IC device of claim 13, wherein the memory interface circuitry comprises:

a compute express link (CXL) interface managed by the primary processor; and a memory controller selectively coupled to the primary processor via the gating circuitry.

15. The multi-processor IC device of claim 11, wherein the control signal is generated by the secure processor in response to receiving a cryptographic command signal from an external entity.

16. A method of operation in a multi-processor device, the multi-processor device including a memory interface, a primary processor, and a secure processor, the method comprising:

enabling read and write access to the memory interface by the primary processor in system boot-up mode of operation, the enabling controlled by the secure processor; and disabling read and write access to the memory interface by the primary processor for all memory access operations carried out in a normal mode of operation, the disabling controlled by the secure processor.

17. The method of claim 16, wherein the enabling access to the memory interface includes:

receiving a signed command combined with a challenge nonce from an external entity; and generating an enable signal with the secure processor to control a gating circuit to couple the primary processor to the memory interface.

18. The method of claim 16, wherein the enabling access to the memory interface includes:

automatically generating an enable signal with the secure processor based on an internal boot sequence status, the enable signal to control a gating circuit to couple the primary processor to the memory interface.

19. The method of claim 16, wherein the enabling access to the memory interface by the primary processor in the system boot-up mode of operation further comprises:

performing, with the primary processor, built-in-self-test (BIST) and debug operations associated with an external memory coupled to the memory interface.

20. The method of claim 19, further comprising:

following the BIST and debug operations, placing, by the secure processor, the multi-processor device in the normal mode of operation; and disabling access to the memory interface by the primary processor for all of the memory access operations.

* * * * *